June 23, 1936. G. W. BATCHELL 2,045,259
LEER
Filed April 24, 1933 3 Sheets-Sheet 1

Inventor
George W. Batchell
By Faust G. Crampton
Attorney

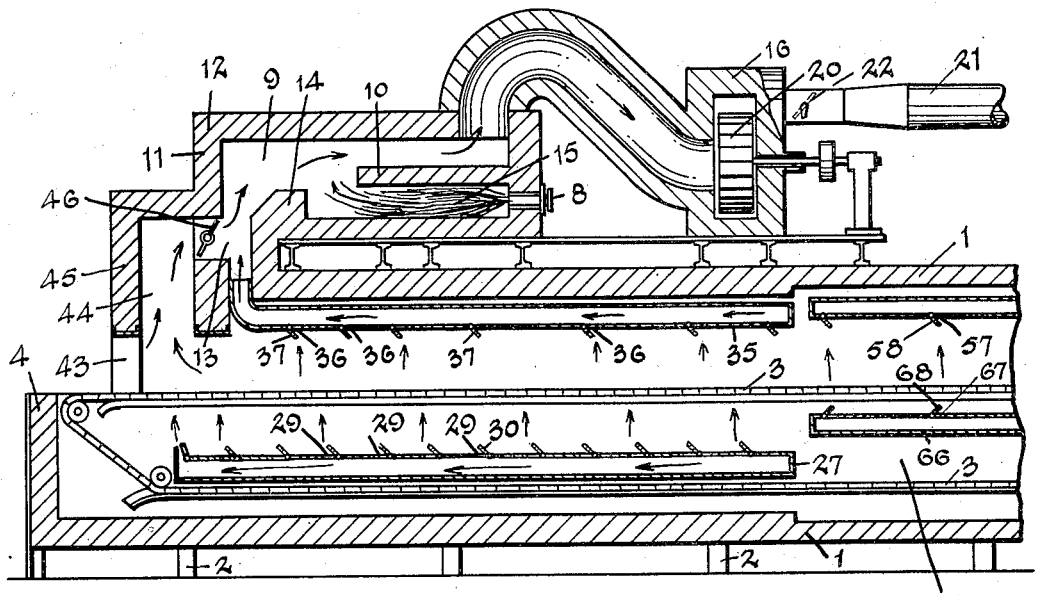

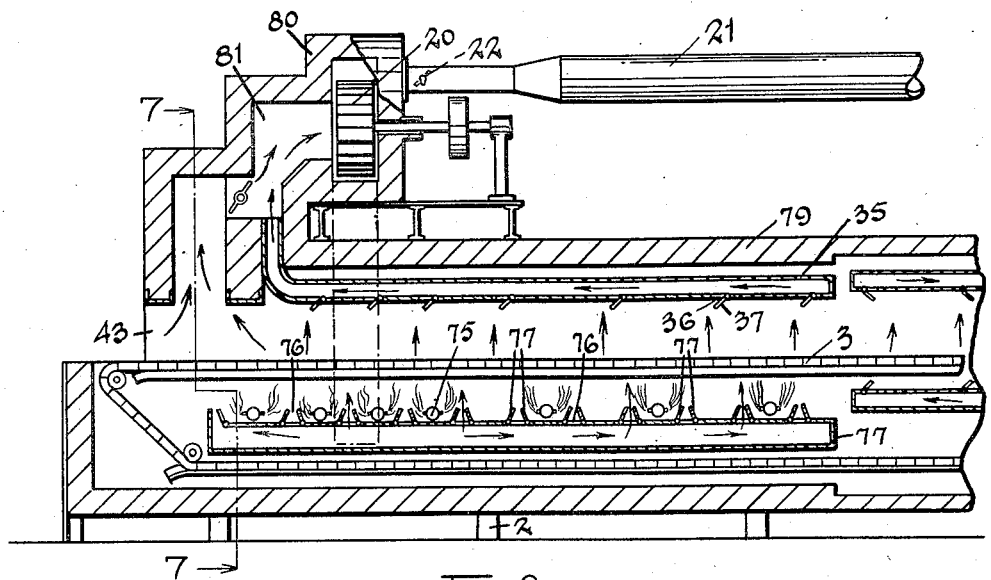
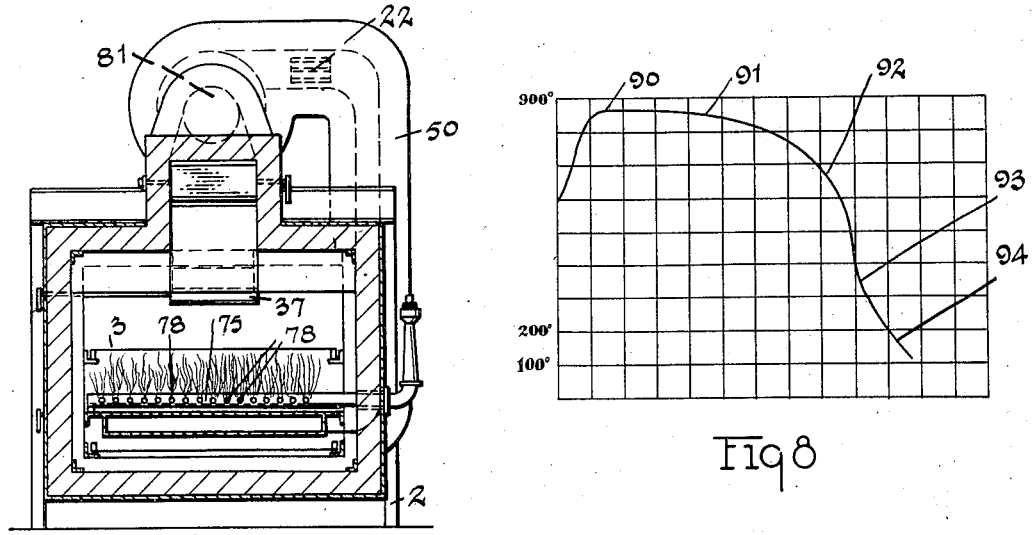

Patented June 23, 1936

2,045,259

UNITED STATES PATENT OFFICE 2,045,259

LEER

George W. Batchell, Toledo, Ohio

Application April 24, 1933, Serial No. 667,602

5 Claims. (Cl. 49—47)

My invention has for its object to provide a heating means for leers for glass, porcelain and similar ware, whereby all parts of the ware will be uniformly raised in temperature at a desired rate to above the required critical temperature and is then allowed to slowly reduce in temperature throughout all its parts following a desired gradient of temperature until the temperature has reached a point that it may be exposed to atmospheric temperature without affecting the temper or annealed condition of the ware.

The invention particularly has for its object to maintain the ware located in different parts of the leer at desired temperatures and to eliminate convected currents of gas produced by the transmission of the heat from the gas within the furnace through the walls of the furnace to the exterior. This produces a downward movement of colder air in the regions of the walls of the leer which operates to chill that portion of the ware located in the vicinity of the walls, with the result that the ware located on the conveyor in the center of the annealing chamber of the leer is much hotter than the ware in the region of the walls and with the result that different portions of the ware are not heat treated uniformly and some of the ware is not annealed to the same degree that other portions of the ware are annealed.

The invention also has for its object to direct the heated air or gas within the leer over the surfaces of the articles that are moved through the leer, as well as maintain a controlled economic heat distribution throughout all parts of the leer, while producing the necessary rise of temperature and a slow descending annealing temperature as the ware is conveyed through the leer.

The invention provides means for producing a rapid circulation of the air or gas or a mixture of air and gas over the surfaces of the articles and prevents local circulation of heated gas or air as produced by convective gas currents and thereby causing all the ware, located at any particular plane extending at right angles to its length, to have the same temperature.

The invention may be used in connection with direct or indirect heated leers and, to illustrate a practical application of the invention, I have selected two forms of leers as examples of structures containing my invention, it being understood that such structures may partake of different forms and be modified in their details. The structures selected are illustrated in the accompanying drawings.

Figure 1:
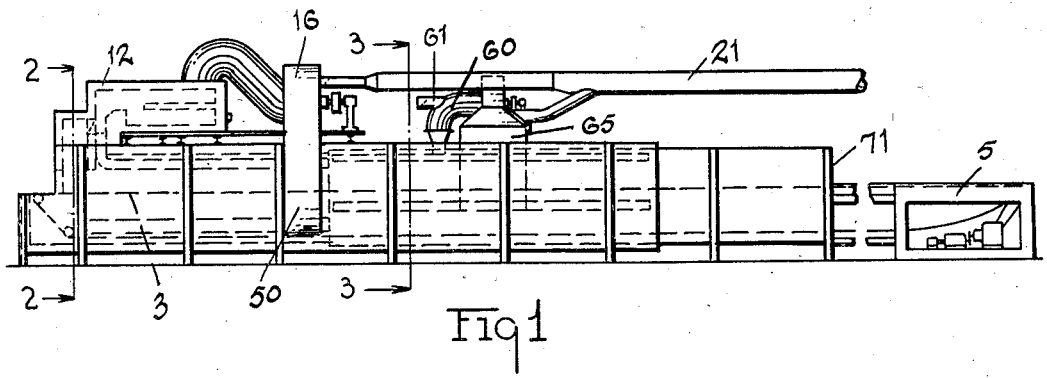
Figure 2:
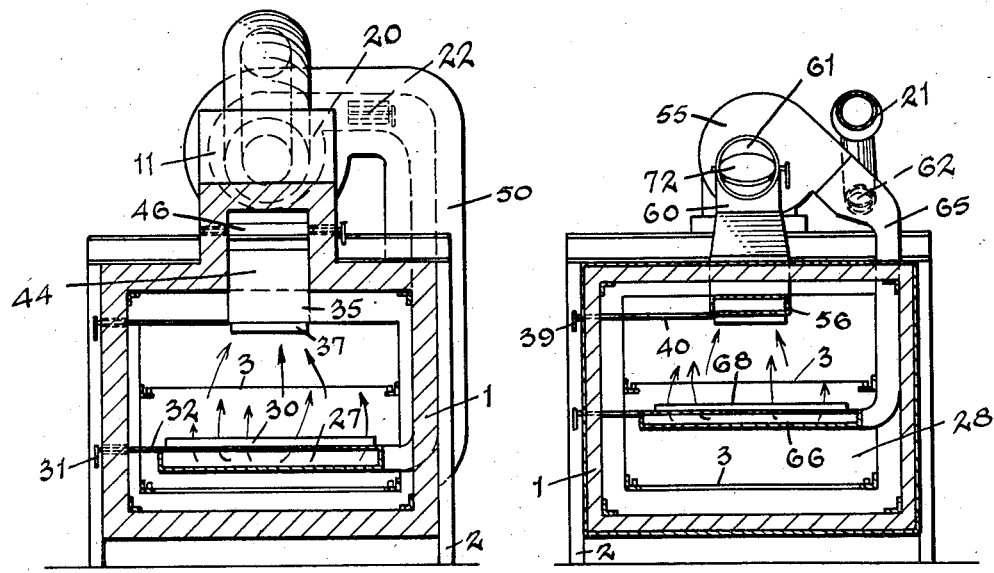
Figure 3:
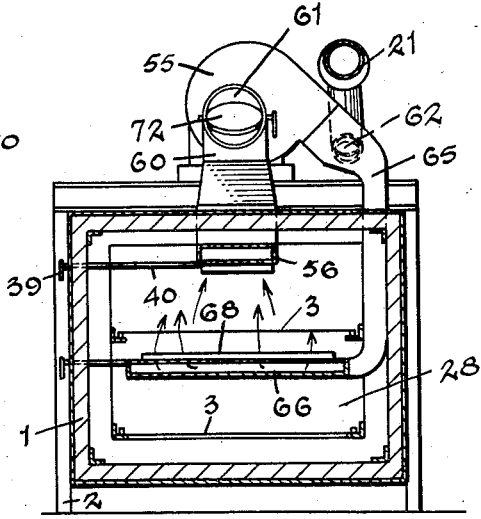

Fig. 1 is a side view of a leer that is indirectly heated by heated air and the products of combustion produced in the heating of the air. Fig. 2 is a view of a section of the leer shown in Fig. 1 taken on the plane of the line 2—2. Fig. 3 is a view of a section of the leer shown in Fig. 1 taken on the plane of the line 3—3. Fig. 4 is a view of a longitudinal vertical section of the forward end part of the leer shown in Fig. 1. Fig. 5 is a view of a section taken on the same plane as that shown in Fig. 4 through the rear end of the leer. Fig. 6 illustrates a modified form of leer and wherein the leer is heated by burners located within the chamber through which the ware is conveyed. Fig. 7 is a view of a section taken on the plane of the line 7—7 indicated in Fig. 6. Fig. 8 shows the temperature curve found desirable for maintaining glass as it progresses through the leer to effectively anneal the glass.

In the form of construction shown in Figs. 1 to 5, the air is heated and mixed with the hot products of combustion exterior to the annealing chamber of the leer and is directed to and distributed through the annealing chamber of the leer at controlled rates and in localities such as to maintain a desired temperature differential to cause a rapid rise and a gradual decrease in temperature as the ware is conveyed at a uniform rate through the annealing chamber of the leer. The walls 1 of the leer are formed of refractory heat insulating material, suitably supported and bonded by a metal frame 2, in the manner well known in leer structures. It is provided with the usual conveyor belt 3 driven by a suitable motor means. The belt, as is common in connection with such structures, is meshed to allow the free movement of air and gases through the conveyor so as to permit efficient transmission of the heat of the air or gases or mixture of air and gases to the ware, as it is conveyed by the conveyor. The conveyor 3 extends over the apron 4, where the ware is delivered to the conveyor, through the leer and then over the table 5 where the ware is removed from the conveyor. Preferably, the belt returns through the leer to conserve the heat of the belt.

The leer shown in Figs. 1 to 5 is indirectly heated by one or more burners 8 through which a fuel gas is directed into the chamber 9 located above the leer. Preferably, the flame is baffled by the baffle 10 to increase the area of heat transmission and confine the current of the air within a restricted chamber formed by the heated walls to increase the amount of heat transmitted to the air as it passes through the heater 12. The air and gases or mixture of air and gases or the circulated gas—it being understood that the word "gas" as used hereinafter refers to air or combustion gases from the burners, or a mixture of air and the products of combustion, unless otherwise specified—enters the chamber 9 of the heater 12 through a passageway 13 and is deflected by means of a baffle wall 14 to the top of the chamber 9 and so that it passes over the baffle wall 10 which is heated by the flame 15. Within the chamber 9 it mixes with the products of combustion and gas from the flames and enters the blower 16.

The blower 16 has the usual rotor 20 that draws the gas from the chamber 9. To reduce the proportionate quantity of combustion gas in the gas and air mixture and maintain a substantially constant quantity of gas in circulation, the outlet pipe of the blower may be connected to a stack through the pipe 21. The flow of the stack may be regulated by the damper 22. The dampered opening will regulate the flow of the gas to the stack and remove a quantity of mixed combustion gas and air, preferably proportionate to the quantity of air that is drawn from the outside atmosphere thereby maintaining a reduced quantity of combustion gas in the mixture that is circulated and prevent outflow of the gas from the leer.

The major portion of the gas from the blower is directed to a flue 27 located in the forward end of the annealing chamber 28 of the leer. The forward end of the flue 27 is located below that portion of the belt 3 where the ware is raised to substantially its maximum temperature, that is, above the critical annealing temperature of the ware. The flue 27 extends laterally a width approximating that of the conveyor belt 3. It is provided with openings 29 that extend the width of the flue 27 and so as to distribute the gas over the surfaces of the articles supported on the conveyor belt 3. The effective areas of the openings are controlled by a plurality of dampers 30 that may be manipulated by means of handles 31 located on rods 32 that are connected to the dampers 30. Thus the dampers 30 may be adjusted as may be desired to regulate the quantity of gas that is allowed to escape through each of the openings to bring about the desired temperature differential at different points along the annealing chamber 28 of the leer and through which the ware is progressively conveyed by means of the conveyor belt 3.

The heated gas may be directed upwardly or downwardly, or crosswise diagonally or horizontally through the annealing chamber or the like, to prevent the formation of convected currents, and move continuously over the surfaces of the ware. In the form of construction shown, the heated gas is distributed over the entire area of the under side of the conveyor belt and by reason of their upward movement all local currents of air, such as would be otherwise induced by convection, are prevented, causing all the ware to be raised progressively through the same temperatures. In order to maintain the circulation over the surfaces of the ware, the gas is drawn into the flue 35 which also is provided with the ports 36 that are controlled by the dampers 37. The flue 35 is connected with the passageway 13 which is subject to the draft caused by the blower 16. The distribution of the gas, and consequently the temperatures in different parts of the leer, is controlled by varying the effective area of each of the openings 36 by adjustment of the dampers 37 which are connected to the handles 39 by means of the rods 40. The gas is thus circulated by the blower 20 through the heater 12 and the ware is soon heated to a point above the critical point, such as to 900° or 1000° Fahrenheit, according to the composition or material of the ware.

The ware is placed upon the conveyor belt 3 where the belt extends into the apron 4 formed by a protruding portion of the lower part of the wall 1 of the leer and is conveyed through the opening 43 into the annealing chamber of the leer. In order to prevent loss of heat by escape of the hot gas from the leer, through the opening 43, a pressure slightly below atmospheric is formed within the leer at the opening 43 which produces a continuous inflow of air at the opening 43. This movement may be slight and only sufficient to prevent the outward movement of the hot gases from within the leer. The air, together with a small quantity of the hot gas, is drawn through the passageway 44 formed beneath the hood 45 and into the chamber 9. The amount of air that is thus drawn into the heating chamber 9 through the opening 43 may be regulated by a suitable damper 46 which also regulates the pressure differential at the opening 43. The adjustment of the damper 22 will provide for the removal of the combustion gas though mixed with air in proportion to the amount of air that enters through the openings 43. The draft through the pipe 21 to the stack will compensate for the entrance of the air through the opening 43.

The major portion of the hot gas, directed to the flue 27 through the pipe 50 is, by regulation of the dampers 30, brought to the forward end of the flue 27 and passes to the chamber 9 through the passageway 44 and the openings 36 as regulated by the dampers 37. In order to produce a rapid rise in temperature, the dampers 30 of the rear half of the flues 27 and 35 are reduced in their effective areas to allocate the hot gas to produce the desired rise and to supply heat to the central portion of the leer.

The temperature of the ware itself cooperates to prevent rapid reduction of the temperature of the interior of the leer by the heat stored within the ware. Circulation of the gases is maintained in the rear end portion of the leer to prevent local convective movement of the gases produced by the chilling action of the walls. Some of the hotter gas from the forward circulating system may be drawn rearwardly into the gas circulatory system of the rear end of the leer. This is dependent upon the relative pressures produced in the ends of the annealing chamber of the leer.

The rear end portion of the leer is provided with a blower 55 that operates to draw the gases from a chute 56 that extends over the conveyor belt 3 and is provided with a plurality of openings 57 that are controlled by dampers 58 which are provided with handles, such as the handles 39, to which they are connected by means of rods similar to the rods 40 and thus may be adjusted to produce the movement of the gas within the leer through the ware at a rate that will prevent the production of convected currents of the gas. If desired, air may also be drawn into the circulating gas from the atmosphere through the dampered opening 61 located in the pipe 60 proportionate in amount of the combustion gas that may be drawn by the operation of the blower 55 from the forward end of the leer. The amount drawn through the opening 61, however, will be varied according to the amount of air that is drawn through the ware delivery opening at the rear end of the leer. The stack pipe 21 is also connected to the delivery end of the blower 55 and the connection with the stack may be dampered by means of the damper 62.

The gas is directed from the blower 55 through the pipe 65 to the chute 66 having a width approximating that of the width of the conveyor 3 and having a length that is somewhat greater than one-third the length of the leer. The chute 66 is provided with the openings 67 whose effective areas are modified by means of the dampers 68 which may be connected to rods, such as the rods 40, and may be operated by handles, such as the handles 39, located on the outside of the leer. The forced circulation of the gas within the chamber of the leer prevents convection of gases cooled by the walls and thus produces a uniform degree of temperature in the ware as it is conveyed through the leer by the conveyor. When the temperature of the ware decreases to a certain point, it may be allowed to rapidly descend which will be caused by the intake of the air through the opening 71 formed at the rear end of the leer. The amount of the air that is thus drawn into the rear end opening of the leer, will be dependent upon the adjustment of the damper 72 with reference to the damper 62, and the relative adjustments of the dampers on the rear ends of the upper and lower rear chutes. This is also dependent upon the adjustment of the dampers 30 and 37 to cause a forward movement of the gas into the forward end of the leer. Thus the dampers 72 and 62 provide means for drawing into the leer the cooler air which operates to bring the temperature of the ware rapidly to such a temperature that the ware may be handled in removing it from the delivery frame 5.

In the form of construction illustrated in Figs. 6 and 7, the leer is directly heated by burners located within the forward end of the annealing chamber of the leer. A plurality of burners 75 are disposed under the forward end of the conveyor belt 3 and are located intermediate the openings 76 formed in the flue 77. Preferably, the effective area of each opening 76 is controlled by a pair of dampers 77 that are located contiguous to the burners 75. Each of the burners are provided with a plurality of jets or openings 78 directed towards the dampers 77 that are heated by the flames and, consequently, heat the air as they pass between the dampers. The dampers, when closed or when partially opened, extend upward to form V-shaped jets through which the gas passes and is heated by the flames. Preferably, a larger number of the burners 75 are located per lineal foot of the chute 77 above the forward end portion of the chute to produce a rapid rise in temperature of the ware to above the required critical temperature of the ware that is to be annealed. The blower 80 operates in the same manner as the blower 16 in the form of construction illustrated in Fig. 4 to reduce the pressure of the gas in front of the opening 43 to cause inward movement of the air at this point and prevent the escape of the gas heated by the flames of the burners. The blower 80 also operates to draw the air from the chute 35 which is provided with openings 36 whose effective areas are controlled by adjustment of the dampers 37. The air through the opening 43 and the combustion gas from the forward end of the leer are drawn into the chamber 81 by the rotor 20 which may be driven by a suitable source of power. The outlet of the blower is connected to the stack by means of the pipe 21 and the flow into the pipe 21 is regulated by the damper 22 as in the form of construction shown in Fig. 4 to convey away mixture of air and combustion gas in amount substantially equal to that of the air supplied through the opening 43. The remaining gas from the blower is directed through the pipe 50 to the chute 77 and the temperature of the gas is raised as it passes the burners 75. As the ware passes through the leer 79, circulation is maintained by the blower 55 which is connected to the chutes 56 and 66, as described in connection with the construction illustrated in Figs. 1 to 5, until the ware meets with the air that is drawn through the openings 71 formed at the rear end of the leer, the surplus gas being drawn into the stack through the pipe 21 to which the delivery pipe 65 of the blower is connected.

As shown in Fig. 8, the temperature of the ware is raised to nearly 900° Fahrenheit, as indicated at 90, and as it passes through the leer it gradually decreases as indicated at 91, and as it passes from above the rear end of the chute 66 it rapidly declines, as indicated at 92, to such a temperature that it may be safely brought in contact with atmospheric temperature, such as indicated at 93, and is moved out over the delivery table 5 at a point substantially at 94.

Thus the invention affords a means for controlling the leer temperature by first raising the temperature of the gas to such a degree and at such a rate as to cause the rise of the temperature of the ware to the desired temperature. The temperature of the interior of the leer is maintained by the heat of the ware and by circulation of the gas to prevent cooling of the ware disposed in vicinity of the edges of the belt while the ware on the central portion of the belt is maintained at a relatively higher temperature. Thus the air currents prevent the irregularities of cooling caused by convected currents and maintains the entire interior of the leer at any cross-section of its length at substantially the same temperature.

I claim:

1. In a leer for annealing glassware, a leer chamber having a heating zone, a conveyor belt for conveying ware through the leer, the forward end of the leer having an opening for receiving ware, a connector chamber, a passageway for connecting the said end of the leer with the connector chamber, a conductor passageway for conducting air and combustion gases from the connector chamber into the rear end of the heating zone, a fuel heater for heating air and gases circulated through the heating zone, a pressure means for producing a gas pressure in the conductor passageway to force the gases to the rear end of the heating zone, a stack pipe connected to the leer for removing a mixture of the combustion gases and air from the circulated mixture of gas and air in an amount substantially equal to the amount of air drawn through the said opening.

2. In a leer for annealing glassware, a leer chamber having a heating zone, a conveyor belt for conveying ware through the leer, an upper duct located above the conveyor belt, and a lower duct located below the conveyor belt, the said ducts extending substantially throughout the length of the heating zone, the upper duct having openings on their lower sides and the lower duct having openings on their upper sides, the end of the leer having an opening for receiving ware, a connector chamber, a passageway connecting the upper duct with the connector chamber, a passageway for conducting air received through the said opening to the connector chamber, a passageway interconnecting the said passageways and having a damper for regulating the movement of air therethrough, a conductor passageway for connecting the connector chamber with the lower duct, a fuel burner for heating the circulated air, a blower located in the conductor passageway for forcing air and products of combustion through the said conductor passageway, a stack pipe connected to the connector passageway on the delivery side of the blower, and a damper located in the stack pipe passageway for regulating movement of the gases from the connector chamber, the said dampers operating to regulate the air flow from the exterior of the leer and discharge of gases from the leer equal in amount to the air drawn from the exterior atmosphere.

3. In a leer for annealing glassware, a leer chamber having a heating zone, a conveyor belt for conveying ware through the leer, an upper duct located above the conveyor belt and a lower duct located below the conveyor belt, the ducts extending substantially throughout the length of the heating zone and having openings in their sides adjacent the conveyor belt, the end of the leer having an opening for receiving ware, a connector chamber, a passageway for connecting the said end of the leer with the connector chamber, a second passageway for connecting the upper duct with the connector chamber, a fuel heater for heating the connector chamber, a conductor passageway for conducting air and combustion gases from the connector chamber into the lower duct in the heating zone, a blower located in the conductor passageway, and a stack pipe connected to the conductor passageway on the delivery side of the blower for removing a mixture of the combustion gases and air from the conductor passageway and air into the leer through the said opening.

4. In a leer for annealing glassware, a leer chamber having a heating zone and a tempering zone, a conveyor belt for conveying ware through the leer, the forward end of the leer having an opening for receiving ware, a connector chamber located above the forward end of the leer, a passageway for connecting the forward end of the leer with the connector chamber, a fuel heater for heating the air and gases circulated through the heating zone, a conductor passageway for conducting air and combustion gases from the connector chamber to the rear end of the heating zone, a pressure means in the conductor passageway for forcing air and gases to the rear end of the heating zone, a stack pipe connected to the leer for removing a mixture of the combustion gases and air from the circulated mixture of gas and air in an amount substantially equal to the amount of air drawn through the opening, the rear end of the leer having a ware delivering opening, a second conductor passageway connecting the upper and lower sides of the tempering zone of the leer, a pressure means located in the said second conductor passageway for removing air and gases from the interior of the tempering zone of the leer and drawing air through the said ware delivering opening.

5. In a leer for annealing glassware, a leer chamber having a heating zone and a tempering zone, a conveyor belt for conveying ware through the leer, a plurality of upper ducts located above the conveyor belt and a plurality of lower ducts located below the conveyor belt, the said ducts extending substantially throughout the length of the said zones, the said ducts having openings on the sides adjacent the conveyor belt, the leer having openings for receiving and delivering ware, a connector chamber, a passageway connecting the upper duct of the heating zone with the connector chamber, a passageway connecting the ware receiving end of the leer with the connector chamber, a fuel heater for heating the connector chamber, a conductor passageway connecting the connector chamber with the lower duct in the heating zone, a pressure means located in the conducting passageway for forcing air and combustion products into the said lower duct of the heating zone, and a stack pipe connected to the conductor passageway on the delivery side of the blower for removing a mixture of the combustion gases and air from the conductor passageway and drawing air into the connector chamber through the ware receiving opening, a tempering zone, a second conductor passageway interconnecting the upper and lower ducts of the tempering zone, a pressure means located in the said second conductor passageway for forcing air and gases to the lower duct of the tempering zone, and a stack pipe connected to the said second conductor passageway on the delivery side of the said pressure means and operative to draw air from the ware delivering opening into the tempering zone of the leer.

GEORGE W. BATCHELL.